No. 839,143. PATENTED DEC. 25, 1906.
C. HENRIKSSON.
WHEELED DIRT RECEPTACLE.
APPLICATION FILED AUG. 1, 1906.
3 SHEETS—SHEET 1.
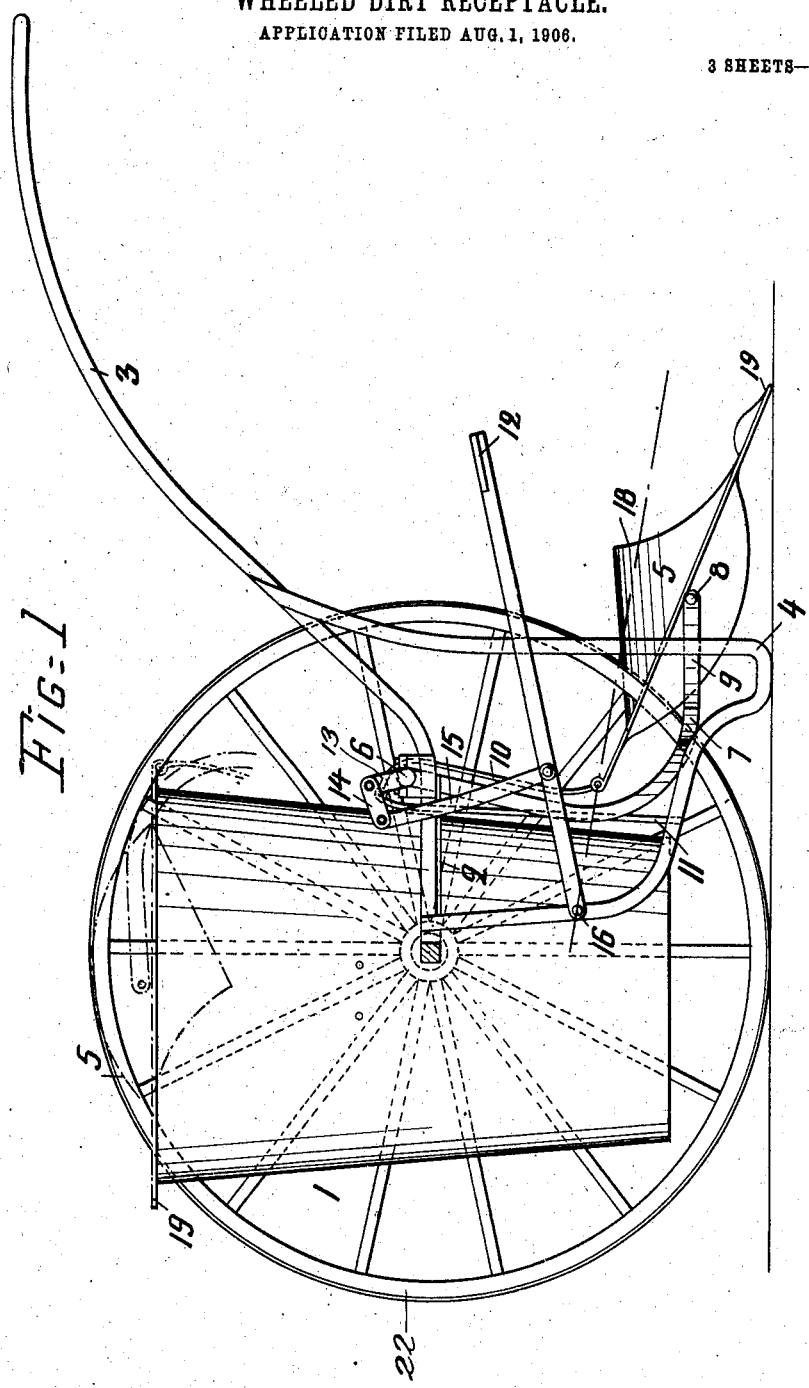
Witnesses:
Inventor:
Carl Henriksson

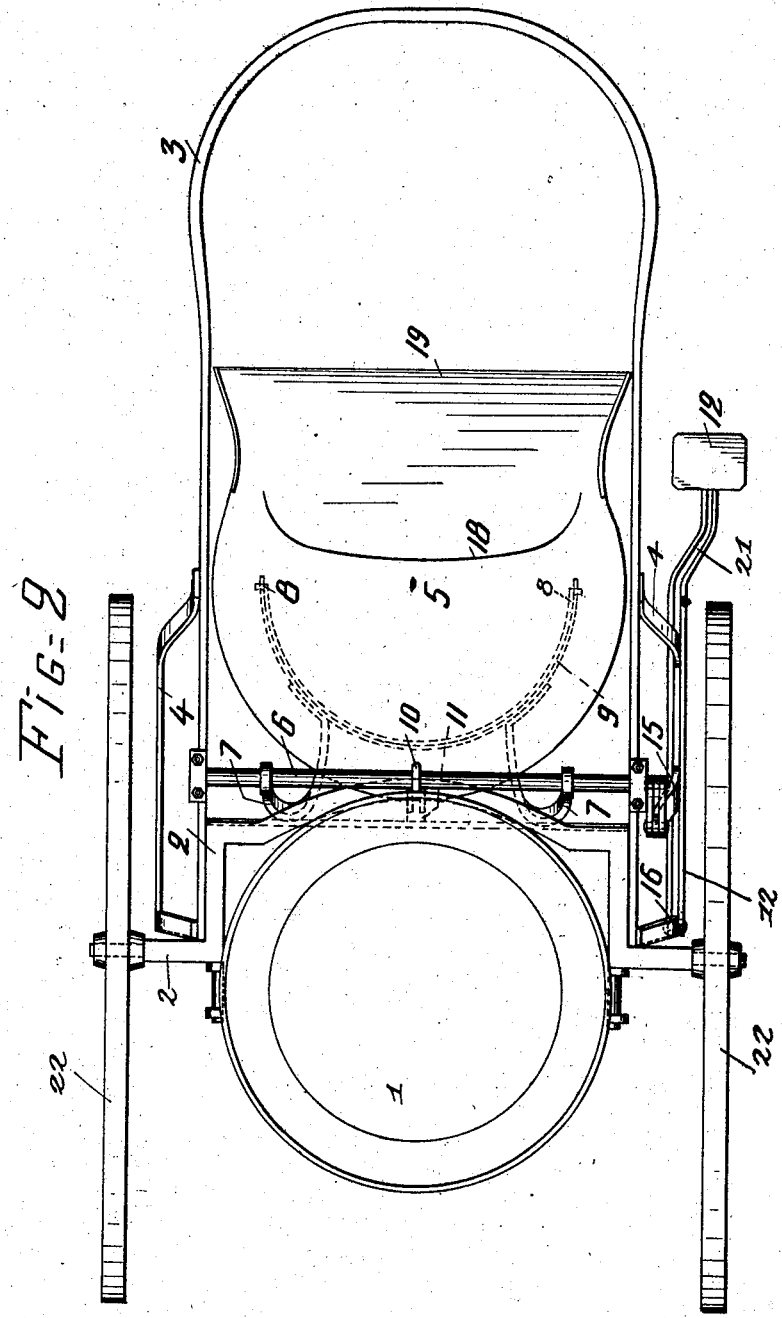

No. 839,143. PATENTED DEC. 25, 1906.
C. HENRIKSSON.
WHEELED DIRT RECEPTACLE.
APPLICATION FILED AUG. 1, 1906.
3 SHEETS—SHEET 3.
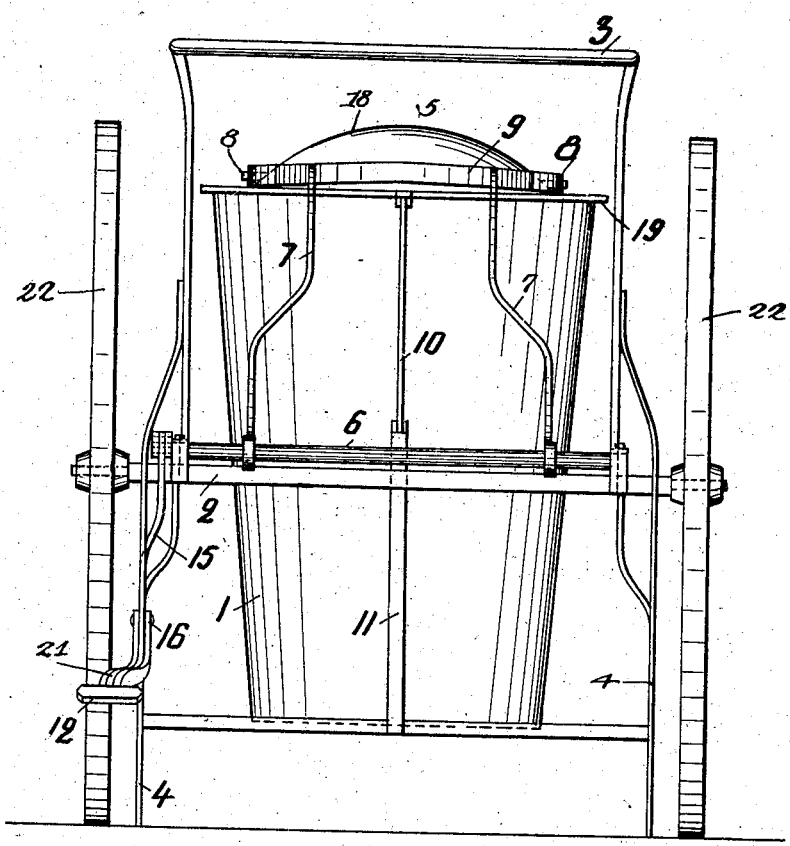
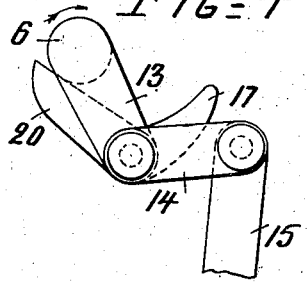
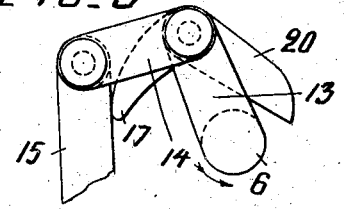
Witnesses:
Inventor
Carl Henriksson
by Henry Connett
Attorney

UNITED STATES PATENT OFFICE.

CARL HENRIKSSON, OF STOCKHOLM, SWEDEN, ASSIGNOR TO AKTIEBOLAGET S. HENRIKSSONS SPRUTFABRIK & MEKAMISKA VERKSTAD, OF STOCKHOLM, SWEDEN.

WHEELED DIRT-RECEPTACLE.

No. 839,143.      Specification of Letters Patent.      Patented Dec. 25, 1906.

Application filed August 1, 1906. Serial No. 328,786.

*To all whom it may concern:*

Be it known that I, CARL HENRIKSSON, a subject of the King of Sweden, residing in Stockholm, Sweden, have invented certain new and useful Improvements in Wheeled Trucks, of which the following is a specification.

This invention relates to wheeled trucks with receptacles for collecting refuse on streets, such as are provided with a pan disposed in front of the upright receptacle or body of the truck and carried by the frame of the device, said pan being mounted to swing about journals in such a manner that it can be lowered to the ground by a lever to a position where the refuse, dirt, &c., may be swept into it and then raised to a position above the receptacle for dumping its contents into the same. So far as known to me in trucks for this purpose the operating-lever has been so disposed that the lifting of the pan is apt to move the vehicle along the roadway, as its wheels roll easily, and the operator must hold the vehicle with one hand while he operates the lever with the other hand, thus necessitating his laying down his broom or hand implements whenever the pan is to be emptied.

The object of the present invention is, in the main, to overcome the above difficulties and others, as will be hereinafter explained.

In the accompanying drawings, which serve to illustrate an embodiment of the invention, Figure 1 is a side elevation of the vehicle, the pan being represented in full lines as resting on the ground, and in its elevated or discharging position it is represented in dotted lines. Fig. 2 is a plan of the vehicle. Fig. 3 is a front elevation showing the pan in its elevated dumping position. Figs. 4 and 5 are detail views on a larger scale. These will be hereinafter described.

The receptacle or body 1 is mounted removably at two points on the bent axle 2 of the vehicle, the bail-like handle 3 being secured firmly to the axle and provided with legs 4, as seen in Fig. 1. These legs are formed of bent bars, as clearly shown in this figure. The pan 5, which is somewhat in the nature of a dust-pan or shovel, is connected with a cross-shaft 6, journaled on the bars of the handle 3 at a point near the axle 2, the connection being through two bent arms 7, which are fixed at one end to the shaft 6 and at the other end to a curved bar 9, (semicircular in plan, as here shown,) this curved bar 9 embracing the pan and pivotally connected thereto at its respective ends by trunnions 8. A link 10, connecting the rear margin of the pan with a fixed part 11, determines the inclination of the pan, Fig. 1, when it rests on the ground when elevated to the dumping position and during its movements.

The movements of the pan 5 are effected by means of a lever 12, the free end of which is in the nature of a treadle to be operated by the foot. The lever is fulcrumed at 16 to one of the legs 4 and is coupled to the shaft 6 for rocking the latter through the medium of a link-and-lever mechanism so constructed that the depression of the lever serves both to lower and to raise the pan 5.

Referring especially to Figs. 4 and 5 for illustration, it will be noted that the shaft 6 has on it a crank-arm 13, which is connected to the lever 12 through the medium of a long link 15 and a shorter link 14. The upright or elevated position of the arm 13 (seen in Figs. 1 and 5) is that taken when the pan 5 rests on the ground, and the dependent position of this arm (seen in Fig. 4) is that assumed when the pan 5 is in its elevated position. In the present position of the parts (seen in Fig. 5) a toe 17, fixed to the crank-arm 13, bears on link 15 and holds the links 14 and 15 in the elevated position shown, so that the link 15 will rock the shaft 6 in the direction shown by the arrow when the lever 12 is depressed. In the position of the parts seen in Fig. 4 a toe 20, rigidly connected with the link 14 and bearing on the shaft 6, holds the link 14 projected forward, as seen in this Fig. 4, whereby pressure upon the lever 12 will rock the shaft 6 in the direction indicated by the arrow in this figure. As the pan 5 is lowered, the link 10 holds and presents it in the proper oblique or inclined position that is most suitable for receiving the sweepings.

When the parts are in the position seen in Fig. 1, downward pressure on the lever 12 rocks the shaft 6, as shown in Fig. 5, the arms 7 being consequently swung upward and the pan 5 brought thereby into the position indicated by the dotted lines in Fig. 1, the bowl-shaped part 18 of the pan being inverted over the receptacle 1 and emptied into the latter through the action of the link 10 and the flat end or lip 19 of the pan brought to rest on the margin of the receptacle 1, like a cover. During this movement the pressure on the lever 12 must be maintained until the pan shall have passed by its center of rotation at the shaft 6, when it will automatically continue in its movement through the force of gravity, so that only a slight retarding pressure on the lever, which will then be moving upward for a little distance, generally suffices to control the descent of the inverted pan onto the receptacle 1. During this movement the toe 20 finally comes in contact with the shaft 6 and brings the link 14 into the position seen in Fig. 4, in which position the momentum of the link 15 suffices to cause the pan to drop when pressure is again exerted on the lever 12. Also by the pressure last mentioned the pan is at first moved past the center of rotation at the shaft 6, whereupon said pan descends to the ground, being actuated by gravity, while the pressure on the lever 12 is correspondingly reduced.

In order to guide it in its movements, the lever 12 may have a slot formed in it, as indicated at 21 in Figs. 2 and 3, so that it embraces and plays over the leg 4 at that side. The entire apparatus or device described will be supported on wheels 22, turning on the axle 2. Obviously the lever may be operated either by the hand or the foot. As the latter is most convenient, the lever is shown herein as adapted and shaped so as to be operated best by the foot. The pan 5 need not actually descend and rest on the receptacle 1 in dumping. It is only necessary that it shall be brought to the dumping position. The bars forming the legs 4 and the U-shaped bar forming the handle 3 constitute a frame and together with the bent axle and the wheels constitute a support for the operative parts and the receptacle.

Having thus described my invention, I claim—

1. In a device for the purpose specified, a frame, an axle in the frame, wheels on said axle to support the parts, a receptacle mounted in the frame, a pivotally-mounted pan to receive sweepings, means for elevating and inverting said pan for dumping its contents into said receptacle, said means comprising a shaft which turns in bearings in the frame and which is provided with an arm, arms in which the pan is pivoted, and which connect the pan rigidly with said shaft, an operating-lever pivotally connected with the frame, a link-and-toe mechanism coupling said lever with the arm on said shaft, and a governing-link coupling the pan with the frame.

2. In a device for the purpose specified, a frame, an axle therein, wheels on said axle to support the parts, a receptacle for sweepings mounted in the frame, an invertible pan, and means for elevating the pan and dumping its contents into the receptacle, and for controlling it in its movements, said means comprising a cross-shaft which turns in bearings in the frame, arms pivotally attached at one end to the pan and rigidly connected at the other end to said cross-shaft, a controlling-link coupled at one end to the frame and at the other end to the back of the pan, an operating-lever coupled at one end to the frame, an arm 13 on said cross-shaft, a link 14 coupled at one end to said arm, a link 15, coupled at one end to said link 14 and at the other end to the operating-lever, and means for holding the links 14 and 15 in their proper positions during the operation of raising, lowering and inverting said pan.

3. In a device for the purpose specified, a frame, an axle therein, wheels on said axle to support the parts, a receptacle for sweepings mounted in the frame, an invertible pan, and means for elevating the pan and dumping its contents into the receptacle and for controlling it in its movements, said means comprising a cross-shaft which turns in bearings in the frame, arms pivotally attached at one end to the pan and rigidly connected at the other end to said cross-shaft, a controlling-link coupled at one end to the frame and at the other end to the back of the pan, an operating-lever coupled at one end to the frame, an arm 13 on said cross-shaft, a link 14 coupled at one end to said arm, a link 15, coupled at one end to said link 14 and at the other end to the operating-lever, the toe 17 on the arm 13, for bearing on the link 15, and the toe 20, on the link 14, for bearing on the cross-shaft.

In testimony whereof I have signed my name to this specification in the presence of two subscribing witnesses.

CARL HENRIKSSON.

Witnesses:
CARL FRIBERG,
ROBERT APELGREN.